United States Patent Office 3,015,666
Patented Jan. 2, 1962

3,015,666
NOVEL 5α,10α-19-NOR STEROIDS AND METHOD FOR THEIR PREPARATION
Eugene Farkas and Richard T. Rapala, Indianapolis, Ind., assignors to Eli Lilly and Company, Indianapolis, Ind., a corporation of Indiana
No Drawing. Filed June 16, 1958, Ser. No. 742,008
8 Claims. (Cl. 260—397.5)

This invention relates to novel steroid compounds and to the methods of preparing them.

The field of steroid chemistry in recent years has seen the synthesis of a new type of steroid structure in which the customary angular methyl group attached to the 10 position is lacking. This new type of steroid has been termed a "19-nor steroid." To date 19-nor steroids which have a sufficient degree of saturation of those nuclear rings customarily identified as the A and B rings, to permit their joinder at the 5-10 positions in a cis or trans configuration, have existed in only two forms—the 5β, 10β-form, the more common form, and the 5α,10β-form.

We have discovered that we can produce novel 19-nor steroid compounds having the 5α,10α-configuration at the junction of the A and B rings of the steroid nucleus. The process comprises hydrogenating in the presence of a ruthenium or rhodium catalyst a 19-nor steroid compound in which the $C_5$ and $C_{10}$ carbon atoms are unsaturated. Illustrative of the process aspect of this invention is the hydrogenation of esterone. When esterone is hydrogenated with a ruthenium or rhodium catalyst, 5α,10α-estrane-3β,17β-diol is produced. It will be observed that not unexpectedly the hydrogenation process employed for obtaining the 5α,10α-configuration of the 19-nor steroid molecule also effects a hydrogenation of such other unsaturations as may be present in the molecule in addition to the unsaturations at the $C_5$ and $C_{10}$-positions. Furthermore, it will be observed that the keto group is reduced to a hydroxyl group during the hydrogenation. However, in general such side reactions do not represent any serious limitations to the use of our novel process since there are extant in the art a variety of methods of oxidizing various substituent groups, and of introducing unsaturations into the steroid nucleus. For example, a hydroxy group at $C_3$ or at $C_{17}$ can readily be oxidized with chromic acid to an oxo (=O) group. Additionally, the introduction of an unsaturation in the steroid nucleus is readily effected by selective halogenation of the nucleus and subsequent dehydrohalogenation.

The novel compounds produced in accordance with the process of this invention can be represented by the following formula which has been so drawn as to show more clearly than by the conventional formula, the spacial relationships of the various parts of the nucleus:

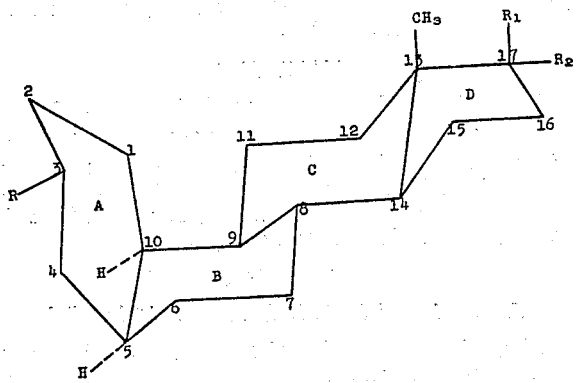

In the fomula R represents hydrogen, hydroxy, or lower alkoxy; $R_1$ represents hydroxy, lower alkyl, lower acyloxy, or α-hydroxyethyl; $R_2$ represents hydrogen or hydroxy; and $R_1$ and $R_2$ taken together represent a cyclic structure such as α,β-ethylenedioxy.

The novel compounds of this invention are useful as intermediates in the synthesis of steroids not hitherto obtainable. For example, 3-hydroxy-17β-acetyl-1,3,5-estratriene can be reduced by our novel process to yield 19-nor-5α,10α-pregnane-3β,20-diol. The diol, which is a novel compound, can readily be oxidized with chromic acid to yield 5α,10α-19-norpregnane-3,20-dione. Selective reduction of this latter compound with sodium borohydride yields 5α,10α-19-norpregnan-20-ol-3-one. Both of these compounds possess a surprising anti-estrogenic activity. Further, by way of illustration, estrone can be hydrogenated to produce 5α,10α-estrane-3β,17β-diol which has anti-estrogenic activity. Additionally, the hydrogenation of 17α-ethylestradiol yields 17α-ethyl-5α,10α-estrane-3β,17β-diol which upon oxidation with chromic acid is converted to 17α-ethyl-5α,10α-estran-17β-ol-3-one. Both compounds are effective in destroying many commonly occurring pathogenic fungi and bacteria. The same sterol compound can be obtained by hydrogenating 17-α-ethinylestradiol followed by a chromic acid oxidation step as mentioned above.

In addition to the above illustrative examples, our novel process can be applied to steroid compounds having one or more substituents variously located in the steroid nucleus. Thus, by applying our process to steroids substituted by a hydroxyl group at $C_{11}$, and unsaturated at $C_5$ and $C_{10}$, steroid derivatives are obtained which are the 19-nor-5α,10α-analogues of corticosterone, cortisone, hydrocortisone and other related compounds. In addition our process can be applied to steroids which are substituted at other positions than $C_{11}$ with a hydroxyl group or which are substituted at various positions with other substituents, for example, nitro, amino, keto, methyl, etc., as for example, 16-hydroxy, 14-methyl, 7-keto, 8-hydroxy, 14-hydroxy and the like. It is apparent from the foregoing that the novel process of our invention is applicable to a wide variety of steroid compounds and is productive of a new series of steroids.

In its process aspect, this invention comprises the hydrogenation at a superatmospheric hydrogen pressure of a liquid dispersion of a $C_5C_{10}$ unsaturated steroid in the presence of a ruthenium or a rhodium catalyst. The hydrogenation conditions are not critical. Thus, for example, the hydrogenation temperature can be room temperature or above. A temperature elevated somewhat above room temperature is customarily employed to promote a satisfactorily rapid hydrogenation. Preferably a temperature not substantially in excess of 50° C. is employed so as to minimize the occurrence of side reactions with consequent decrease in yield of desired final product. The hydrogenation pressure employed preferably is upwards of 500 pounds per square inch to promote a conveniently rapid hydrogenation. Generally, a pressure in the neighborhood of 1,00 to 1,500 pounds of hydrogen per square inch is used.

A variety of liquid dispersing agents can be utilized in the hydrogenation process step, and it is immaterial whether the steroid starting material is soluble or insoluble in the dispersant. For the sake of convenience, however, it is desirable that the hydrogenated steroid be soluble in the dispersant since the removal of the catalyst from the reaction product is then readily effected by simple filtration. As is to be understood, the dispersant is one which is relatively inert to hydrogenation, and does not react either with the steroid that is to be hydrogenated or with the hydrogenated product. Suitable dispersants include water, the alcohols and the hydrocarbons. Lower boiling dispersants are preferred because their greater volatility permits the ready recovery of the hydrogenated steroid by simple evaporation of the dispersant.

The ruthenium and rhodium catalysts used in the hydrogenation step can be employed in the form of finely divided metals or as metal oxides. They are conveniently used in the form of supported catalysts, for example, ruthenium or rhodium metal supported on a suitable material such as alumina, carbon or barium sulfate. Although both ruthenium and rhodium catalysts are effective in producing steroids with $5\alpha,10\alpha$-configuration, the former type is preferred since the yield of final product usually is superior with that type, and moreover, the hydrogenation can be carried out under somewhat milder conditions than a rhodium catalyst requires. The quantity of catalyst employed in the hydrogenation with respect to its metal content preferably is not less than about 1 percent by weight of the steroid compound being hydrogenated. Larger quantities of the catalyst are preferred to promote a more rapid hydrogenation.

This invention is further illustrated by the following specific examples.

EXAMPLE 1

*Preparation of $5\alpha,10\alpha$-estrane-$3\beta,17\beta$-diol*

5 g. of estrone are dissolved in 12.5 ml. of anhydrous ethanol, 2 g. of ruthenium dioxide catalyst are added, and the mixture is hydrogenated at a temperature of about 100° C. under a hydrogen pressure of about 1500 p.s.i. The hydrogenation is continued until sufficient hydrogen is absorbed to reduce fully the benzenoid A-ring and to reduce the ketone at $C_{17}$ to a secondary alcohol. The reaction mixture is filtered to remove the ruthenium catalyst, the filtered catalyst is washed with two successive 25 ml. portions of anhydrous ethanol, and the washings and filtrate are combined and evaporated in vacuo leaving a viscous liquid residue comprising $5\alpha,10\alpha$-estrane-$3\beta,17\beta$-diol. The residue is triturated with ether and hexane until crystalline. The crystals are purified by recrystallization from acetone. 4.2 g. of $5\alpha,10\alpha$-estrane-$3\beta,17\beta$-diol melting at about 179–181° C. are obtained.

*Analysis.*—Calculated: C, 77.65; H, 10.86. Found: C, 77.95; H, 11.09.

EXAMPLE 2

*Preparation of $5\alpha,10\alpha$-estrane-$3\beta,17\beta$-diol*

The process of Example 1 is repeated except that 0.5 g. of finely divided ruthenium metal are substituted for the ruthenium dioxide catalyst. The yield of $5\alpha,10\alpha$-estrane-$3\beta,17\beta$-diol obtained is the same as that obtained in Example 1.

In addition to ruthenium dioxide, other similar catalysts such as rhodium dioxide, rhodium on carbon, and ruthenium on carbon can be employed in the manner described in Example 1 to reduce a steroid having an unsaturation in the 5–10 position to a hydrogenated steroid having the $5\alpha,10\alpha$-configuration.

EXAMPLE 3

*Preparation of $17\alpha$-methyl-$5\alpha,10\alpha$-estrane-$3\beta,17\beta$-diol*

About 15 ml. of an alcoholic solution of 3 g. of $17\alpha$-methyl-$3,17\beta$-estradiol are hydrogenated with 1 g. of ruthenium dioxide catalyst for 4 hours at a temperature of 50° C. and a hydrogen pressure of 1000 p.s.i. The $17\alpha$-methyl-$5\alpha,10\alpha$-estrane-$3\beta,17\beta$-diol which is formed is isolated by filtering off the catalyst and evaporating the alcoholic filtrate to dryness. The methyl estranediol thus obtained is recrystallized from methanol. It melts at about 205–208° C.

*Analysis.*—Calculated: C, 78.03; H, 11.03. Found: C, 77.35; H, 11.17.

EXAMPLE 4

*Preparation of $17\alpha$-ethyl-$5\alpha,10\alpha$-estrane-$3\beta,17\beta$-diol*

Following the procedure of Example 3, 1 g. of $17\alpha$-ethyl-$3,17\beta$-estradiol is hydrogenated over a ruthenium dioxide catalyst to yield 0.8 g. of $17\alpha$-ethyl-$5\alpha,10\alpha$-estrane-$3\beta,17\beta$-diol which melts at about 143–145° C. after recrystallization from acetone.

*Analysis.*—Calculated: C, 78.38; H, 11.18. Found: C, 78.30; H, 11.73.

EXAMPLE 5

*Preparation of $17\alpha$-ethyl-$5\alpha,10\alpha$-estrane-$3\beta,17\beta$-diol*

15 ml. of an alcoholic solution of 4 g. of $17\alpha$-ethinyl-estra-$3,17\beta$-diol are hydrogenated over a 5 percent alumina-supported rhodium catalyst in accordance with the procedure of Example 3. The $17\alpha$-ethyl-$5\alpha,10\alpha$-estrane-$3\beta,17\beta$-diol which is isolated by evaporation of the filtered hydrogenation reaction mixture, is purified by recrystallization from acetone. The purified material melts at about 143–145° C.

EXAMPLE 6

*Preparation of $3\beta$-methoxy-$5\alpha,10\alpha$-estran-$17\beta$-ol*

1 g. of estrone-3-methyl ether is hydrogenated over 0.1 g. of ruthenium dioxide catalyst under the conditions set forth in Example 1, yielding 0.75 g. of $3\beta$-methoxy-$5\alpha,10\alpha$-estran-$17\beta$-ol. After recrystallization from ether the compound melts at about 143–145° C.

*Analysis.*—Calculated: C, 78.03; H, 11.03. Found: C, 77.79; H, 10.86.

EXAMPLE 7

*Preparation of 19-nor-$5\alpha,10\alpha$-pregnane-$3\beta,20$-diol*

750 mg. of 3-hydroxy-$17\beta$-acetyl-$1,3,5$-estratriene are dissolved in 10 ml. of ethanol and are hydrogenated for 5 hours over a ruthenium dioxide catalyst at a temperature of 30° C. and a hydrogen pressure of 1500 p.s.i. The 19-nor-$5\alpha,10\alpha$-pregnane-$3\beta,20$-diol produced by the hydrogenation is isolated and purified by the procedure described in Example 1. The purified product melts at about 190-193° C.; yield=600 mg.

EXAMPLE 8

*Preparation of $5\alpha,10\alpha$-estrane-$3\beta,17\beta$-diol*

A solution of 0.21 g. of $\Delta^{5(10)}$-estren-3-on-$17\beta$-ol suspended in 25 ml. of water is hydrogenated over 0.05 g. of ruthenium dioxide catalyst at a temperature of 30° C. and a hydrogen pressure of 1500 p.s.i. for about 5 hours. The hydrogenated reaction mixture is filtered and the precipitate which consists of catalyst and $5\alpha,10\alpha$-estrane-$3\beta,17\beta$-diol is treated with about 15 ml. of warm acetone. The acetone solution is filtered to remove the insoluble catalyst, and water is added to the filtrate to the point of incipient precipitation of the steroid. The mixture is allowed to stand in the cold, whereupon the $5\alpha,10\alpha$-estrane-$3\beta,17\beta$-diol separates in crystalline form. It melts at about 172–174° C.

EXAMPLE 9

*Preparation of 17-ethylenedioxy-$5\alpha,10\alpha$-estran-$3\beta$-ol*

Following the procedure described in Example 1, 0.6 g. of the 17-ethylene ketal of estrone are hydrogenated over a ruthenium dioxide catalyst to yield 0.21 g. of 17-ethylenedioxy-$5\alpha,10\alpha$-estran-$3\beta$,ol, melting at about 152-154° C. after recrystallization from acetone.

EXAMPLE 10

*Preparation of $5\alpha,8\alpha,9\alpha,10\alpha$-estrane-$3\beta,17\beta$-diol*

1.0 g. of dl-equilenin is hydrogenated over a 5 percent ruthenium-on-carbon catalyst to yield 0.4 g. of $5\alpha,8\alpha,9\alpha,10\alpha$-estrane-$3\beta,17\beta$-diol melting at about 170–175° C. after recrystallization from acetone.

EXAMPLE 11

*Preparation of 19-nor-24-methyl-5α,8α,9α,10α-cholestan-3β-ol*

1.2 g. of neoergosterol are hydrogenated over a ruthenium dioxide catalyst by the procedure of Example 1 to yield 0.13 g. of 19-nor-24-methyl-5α,8α,9α,10α-cholestan-3β-ol melting at about 110° C. In this reduction the double bond between C–22 and C–23 was reduced as well as the three double bonds in the B ring of neoergosterol.

EXAMPLE 12

*Preparation of 5α,10α-estran-3β,17β-diol-17β-acetate*

0.9 g. of 17-acetoxy-estradiol are hydrogenated over a ruthenium dioxide catalyst in accordance with the procedure of Example 1. The catalyst is separated by filtration, and the filtrate is evaporated in vacuo to a residue comprising 5α,10α-estrane-3β,17β-diol 17β-acetate.

Additional steroids which are hydrogenated by the procedures described in the foregoing examples, and the corresponding hydrogenation products, are set forth below:

| Starting Steroid | Final Product |
|---|---|
| 17β-amino-3-hydroxy-1,3,5-estratriene. | 17β-amino-5α, 10α-estran-3β-ol. |
| 2-nitroestrone. | 2β-amino-5α, 10α-estran-3β, 17β-diol. |
| 17α-allyl-17β-estradiol. | 17α-propyl-5α, 10α-estran-3β, 17β-diol. |
| 3-methoxy-17α-allyl-17β-hydroxy-1,3,5-estratriene. | 3β - methoxy - 17α - propyl - 5α, 10α estran-17β-ol. |
| 17α-allyl-17β-hydroxy-Δ¹,³,⁵,⁶,⁸-estrapentaene. | 17α-propyl-5α, 8α, 9α, 10α-estrane-3β, 17β-diol. |

We claim:

1. The method of producing a 19-nor steroid compound having a 5α,10α-configuraiton at the ring junction of the A and B rings of the steroid nucleus, which comprises hydrogenating at superatmospheric pressure in the presence of a catalyst of the group consisting of ruthenium metal, rhodium metal, ruthenium oxide and rhodium oxide, a 19-nor steroid compound having at least a $\Delta^{5(10)}$ double bond.

2. The method of producing a 19-nor steroid compound having a 5α,10α-configuration at the ring junction of the A and B rings of the steroid nucleus, which comprises hydrogenating at superatmospheric pressure in the presence of a ruthenium catalyst a 19-nor steroid compound having at least a $\Delta^{5(10)}$ double bond.

3. The process according to claim 2 in which the ruthenium catalyst is a supported ruthenium catalyst.

4. The process according to claim 2 in which the hydrogenation is carried out at a temperature of about 50° C. and a pressure of about 1500 pounds of hydrogen per square inch, and the ruthenium catalyst is a supported ruthenium catalyst.

5. A compound represented by the formula:

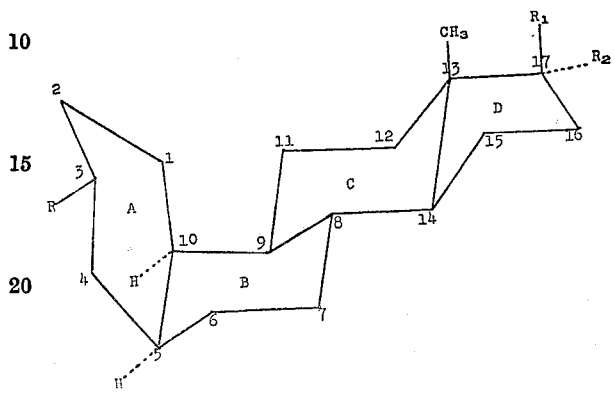

in which R represents a member of the group consisting of hydrogen, hydroxy and lower alkoxy; $R_1$ represents a member of the group consisting of hydroxy, lower alkyl, lower acyloxy, and α-hydroxyethyl; $R_2$ represents a member of the group consisting of hydrogen and hydroxy; and $R_1$ and $R_2$ when taken together represent α,β-ethylenedioxy.

6. 17α-ethyl-5α,10α-estrane-3β,17β-diol.
7. 5α,10α-estrane-3β,17β-diol.
8. 19-nor-5α,10α-pregnane-3β,20-diol.

References Cited in the file of this patent

UNITED STATES PATENTS

| | | |
|---|---|---|
| 2,086,139 | Schoeller et al. | July 6, 1937 |
| 2,094,045 | Schoeller et al. | Sept. 28, 1937 |
| 2,332,486 | Hildebrand et al. | Oct. 19, 1943 |
| 2,843,608 | Colton | July 15, 1958 |

OTHER REFERENCES

Dirscherl Hoppe-Seyler's Zeitschrift für Physiol. Chem., vol. 259, pages 53–66 (1936).

Berkman et al.: "Catalysis" (New York: Reinhold Pub. Corp., 1940), pages 224 and 861.

Bowers et al.: J.A.C.S. 79, 4556–7 (1957).